(12) United States Patent
Hamer

(10) Patent No.: US 8,300,369 B2
(45) Date of Patent: Oct. 30, 2012

(54) SYSTEM AND METHOD FOR POLYPHASE GROUND-FAULT CIRCUIT-INTERRUPTERS

(75) Inventor: Paul S. Hamer, San Ramon, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 352 days.

(21) Appl. No.: 12/570,698

(22) Filed: Sep. 30, 2009

(65) Prior Publication Data

US 2011/0075304 A1  Mar. 31, 2011

(51) Int. Cl.
*H02H 3/00* (2006.01)

(52) U.S. Cl. .......................................... 361/44

(58) Field of Classification Search ............ 361/42, 361/44, 45, 62, 64, 65, 66, 88, 90, 110
See application file for complete search history.

(56) References Cited

U.S. PATENT DOCUMENTS

| 3,840,783 | A | | 10/1974 | Eckart | |
|---|---|---|---|---|---|
| 4,663,690 | A | * | 5/1987 | Bonniau et al. | 361/44 |
| 5,402,071 | A | * | 3/1995 | Bastard et al. | 324/509 |
| 5,629,825 | A | | 5/1997 | Wallis et al. | |
| 7,099,130 | B2 | * | 8/2006 | Angle et al. | 361/44 |
| 7,117,105 | B2 | | 10/2006 | Premerlani et al. | |
| 7,180,300 | B2 | | 2/2007 | Premerlani et al. | |
| 7,301,739 | B2 | * | 11/2007 | Hamer | 361/42 |
| 2007/0081281 | A1 | | 4/2007 | Hamer | |

* cited by examiner

*Primary Examiner* — Ronald W Leja
(74) *Attorney, Agent, or Firm* — Carlos L. Henze

(57) ABSTRACT

A ground-fault circuit-interrupter (GFCI) system is provided that provides reliable and timely tripping of faulted circuits while minimizing so-called "nuisance" tripping. The GFCI includes a voltage unbalance detection device coupled to the main bus circuit for detecting a voltage unbalance during a fault condition. A computer processor in communication with the voltage unbalance detection device is programmed to determine when an actual fault condition exists based on a state of the voltage unbalance and certain predetermined among the fault signal generated by a GFCI unit in the main bus circuit and the fault signals generated by GFCI units in individual feeder circuits.

25 Claims, 11 Drawing Sheets

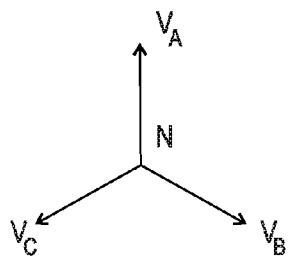
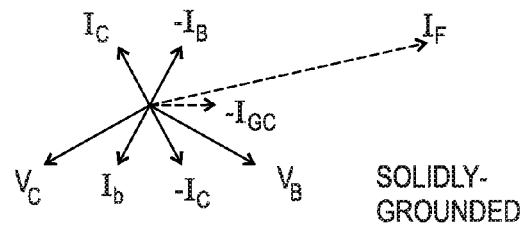
FIG. 3a  FIG. 3b  SOLIDLY-GROUNDED
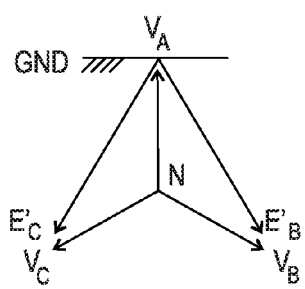
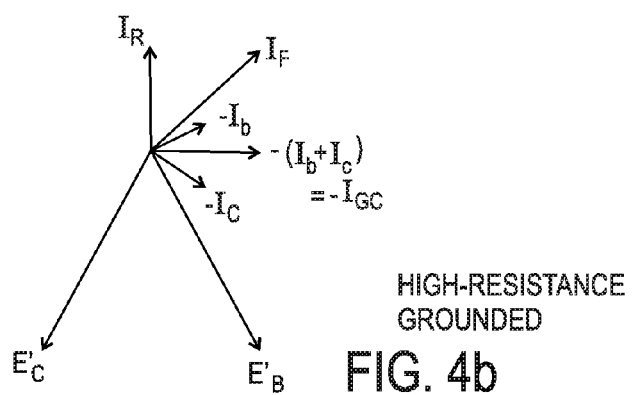
FIG. 4a  FIG. 4b  HIGH-RESISTANCE GROUNDED
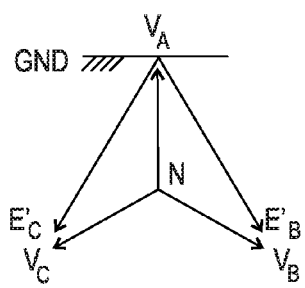
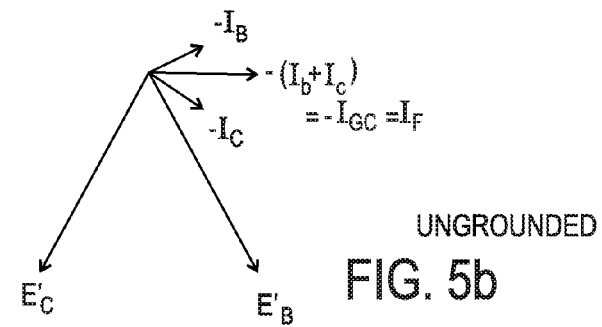
FIG. 5a  FIG. 5b  UNGROUNDED

SYSTEM AND METHOD FOR POLYPHASE GROUND-FAULT CIRCUIT-INTERRUPTERS

FIELD OF THE INVENTION

The present invention relates generally to polyphase ground-fault circuit-interrupter (GFCI) systems, and more particularly to a system and method of using voltage imbalances for tripping intelligence.

BACKGROUND OF THE INVENTION

GFCI systems have been improved to provide prompt detection and isolation of system faults while minimizing nuisance interruptions. See for example U.S. Pat. No. 7,301, 739, which is assigned to the present assignee and which is herein incorporated by reference in its entirety. U.S. Pat. No. 7,301,739 also describes a means to compensate for small capacitive currents that normally flow throughout a three-phase power system during low- or high-level ground-faults, thereby further minimizing tripping of the non-faulted circuits. However, GFCI systems in most common use at this time have been designed with the primary objective of permitting reliable, high-speed ground-fault interruption for single-phase power systems operating at relatively low voltages, e.g., typically less than 125 volts phase-to-ground.

Although conventional GFCI systems can be reliable for three-phase power systems rated 480 volts phase-to-phase (i.e., 277 volts phase-to-neutral or ground) and above, "nuisance" tripping may become more prevalent if used with polyphase systems operating above 125 volts phase-to-ground due to significant capacitive charging currents that are characteristic of insulated phase conductors associated with feeder or branch circuits. These charging currents result from the distributed capacitance of insulated phase conductors in close proximity to grounded surfaces or conductors. For example, in 277 V phase-to-ground, three-phase, multiple feeder systems having one phase faulted to ground, the magnitude of the capacitive charging currents on the unfaulted phases of the non-affected feeders can easily reach a magnitude that will "false trip" the non-affected feeders' GFCIs.

As such, a need exists for a GFCI system that can provide improved tripping "intelligence" or "security" for polyphase power systems at all system voltage levels, and in particular, polyphase power systems operating above 125V phase-to-ground.

A further need exists for an improved GFCI system for three-phase, multi-feeder systems having a ground-fault sensor (GFS) sensitivity corresponding to the lower limit of the human "let-go" threshold of current, i.e., 4-6 mA, which will reliably trip on the affected feeder(s) without causing false interruptions on the unaffected feeder(s). GFSs designed to trip at such low currents typically include current transformers that may be susceptible to magnetic saturation due to high-level ground current conditions on involved branch or feeder circuits. Magnetic saturation of the transformers may cause the corresponding GCFIs to falsely trip non-faulted circuits.

SUMMARY OF THE INVENTION

A system and method for ground-fault circuit-interruption is provided for use with a polyphase power supply and a main bus circuit having multiple feeder or branch circuits. The ground-fault circuit-interrupter (GFCI) system includes a voltage unbalance detection device coupled to the power supply and the main bus circuit for detecting a voltage unbalance among the three phase voltages of the polyphase power supply during a fault condition, and a plurality of GFCI units respectively associated with the main bus and each one of the feeder circuits, each of the GFCI units being operative to generate a fault signal corresponding to a fault condition on the associated feeder or main bus circuit. The system also includes a computer or computational processor in communication with the voltage unbalance detection device and each of the GCFI units for continuously monitoring the voltage unbalance and fault signals generated by the GCFI units.

In accordance with an aspect of the present invention, the processor is programmed to determine when an actual fault condition exists based on a state of the voltage unbalance and certain predetermined relationships among the fault signal generated by the GFCI unit in the main bus circuit and the fault signals generated by the GFCI units in the feeder or branch circuits. The logic then determines which of the feeder or branch circuits is experiencing the actual fault condition, which then causes the processor to generate a trip signal to the GFCI unit or units corresponding to the feeder or branch circuit or circuits experiencing the actual fault condition. As such the corresponding faulted circuit or circuits are interrupted.

The logic further causes the processor to generate an inhibit (or "no trip") signal to the remainder of the GFCIs at the feeder or branch circuits, which are not experiencing the actual ground fault condition, thereby causing those non-faulted circuit or circuits to be inhibited from interruption.

The GFCI system in accordance with the present invention can more reliably disconnect power from a faulted feeder circuit without causing the interruption of the other "healthy" feeder circuits. The present invention provides a GFCI system that can more reliably detect an actual fault, determine the location of the actual fault, and promptly interrupt the faulted circuit as required. The present invention also minimizes false trips of non-faulted circuits, especially those circuits having GFCI's that are subject to power system capacitive charging current influences and GFS magnetic saturation effects during severe phase-to-ground fault events.

BRIEF DESCRIPTION OF THE DRAWINGS

A detailed description of the present invention is made with reference to specific embodiments thereof as illustrated in the appended drawings. The drawings depict only typical embodiments of the invention and therefore are not to be considered to be limiting of its scope.

FIGS. 3a and b are phasor diagrams illustrating the current distributions of a "solidly-grounded" system;

FIGS. 4a and b are phasor diagrams illustrating the current distributions of a "high-resistance grounded" system;

FIGS. 5a and b are phasor diagrams illustrating the current distributions of an "ungrounded" system;

DETAILED DESCRIPTION

Figure 1:
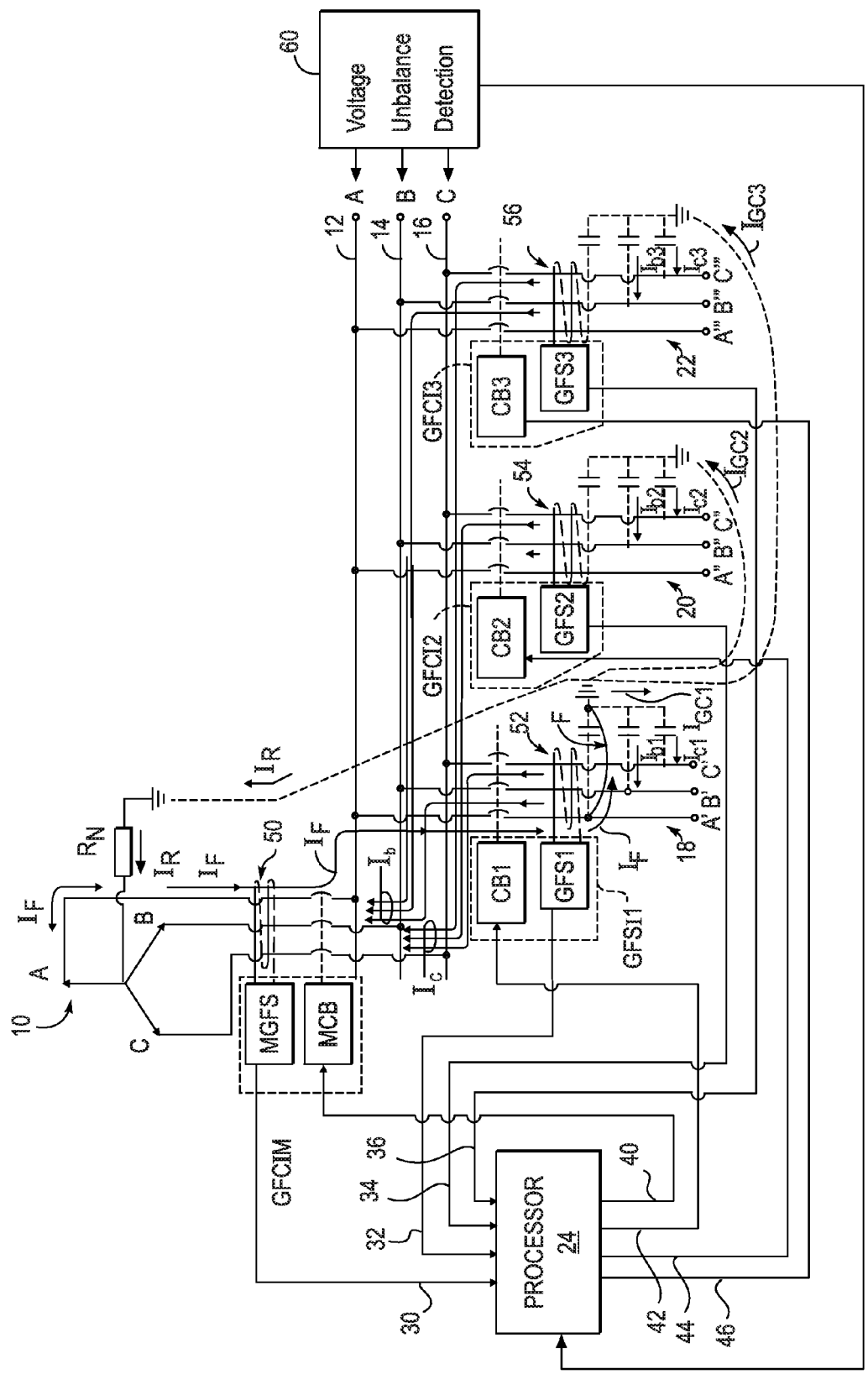
FIG. 1 is a schematic circuit diagram illustrating a three-phase power supply circuit having multiple feeder circuits and a GFCI system in accordance with the present invention.

The present invention may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms and environments. It will be appreciated that the scope and underlying principles of the present invention are not limited to any particular computer software technology.

Moreover, those skilled in the art will appreciate that the present invention may be practiced using any one or combination of hardware and software configurations, including but not limited to a system having single and/or multi-processer computer processors, hand-held devices, programmable consumer electronics, mini-computers, mainframe computers, and the like. The invention may also be practiced in distributed computing environments where tasks are performed by servers or other processing devices that are linked through a one or more data communications network. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present invention. Such devices and articles of manufacture also fall within the spirit and scope of the present invention.

Referring now to the drawings, embodiments of the present invention will be described. The invention can be implemented in numerous ways, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

The present invention relates to a ground-fault interrupter circuit system ("GFCIS-3Ph") for a polyphase power supply system having multiple feeder or branch circuits. By way of example, and not limitation, the present invention is described below with reference to FIG. 1, which shows a wye, or star-connected secondary transformer winding of a three-phase power supply system 10 having three feeder or branch circuits. The terms "feeder" and "branch" are used synonymously with reference to the three circuits fed by power lines A'-B'-C', A"-B"-C", and A'"-B'"-C'", and it is understood that either term can refer to feeder, branch or to other circuits derived from a main circuit. A "fault condition" or "fault signal," for the purposes of the present invention, refers to a condition or signal received from a ground-fault circuit interrupter (GFCI) unit (e.g., GFCI1, GFCI2, GFCI3), ground-fault sensor (GFS, e.g., GFS1, GFS2, GFS3)), or other equivalent device, where the signal represents an actual fault condition or a capacitive current flow due to a system voltage unbalance condition that results from an actual fault anywhere on the polyphase power supply system. An "actual fault" or "actual fault condition" refers to any abnormal current in the power supply system 10 resulting from, but not limited to, a short circuit or abnormally low impedance path between phases or phase-to-ground associated with the power supply system and/or feeder or branch circuits.

The power system to which the GFCIS-3Ph is applicable utilizes a source three-phase power transformer, which most commonly is a delta-wye (alternately termed "delta star"), or a delta-delta, three-phase transformer connection between the high voltage and low voltage sides. Other transformer connections, such as but not limited to the wye-delta or delta-zigzag configurations, may also be used, so long as the system has normally balanced voltages with respect to ground or earth. The power transformer converts the voltage of the distribution system to the voltage level required for power utilization, where the GFCIS-3Ph is applied. When the utilization distribution system suffers an unbalanced phase-to-ground short circuit of a high enough magnitude of current, the fault unbalances the normally equal phase-to-ground system voltages at the local utilization system voltage level.

With further reference to FIG. 1, the three-phase transformer secondary winding of the power supply system 10 is electrically coupled via a main circuit breaker (MCB) to three power buses 12, 14, and 16 providing three-phase power comprised of phases A, B and C, respectively. Connected to the buses 12, 14, and 16 are three-phase feeder or branch circuits shown at 18, 20, and 22, respectively including three power lines A', B' and C; A", B" and C"; and A'", B'" and C'". The three-phase power supply system 10 is also coupled to a GFCIS-3Ph system in accordance with the present invention, which includes a GFCI unit designated GFCIM in the main circuit, and units GFCI1, GFCI2 and GFCI3 in the feeder or branch circuits 18, 20, and 22, respectively. Each GFCI unit includes a ground-fault sensor (GFS1, GFS2 and GFS3, respectively), as does the main supply (MGFS), and circuit breakers for each feeder or branch circuit (designated CB1, CB2 and CB3, respectively) as well as a main supply breaker MCB. Each GFCI produces a "fault signal" indicative of either an actual fault condition or a capacitive current flow associated with a feeder/branch circuit, which is made available to computer processor 24 as described below with reference to the exemplary GFCI shown in FIG. 13. The "fault signal," for example, can be a current or voltage signal representative of an instantaneous unbalanced current flow measured at the corresponding GFS.

Computer processor 24 includes inputs 30, 32, 34 and 36, respectively connected to the main sensor MGFS and the feeder sensors GFS1, GFS2, and GFS3, and outputs 40, 42, 44 and 46 respectively connected to the main circuit breaker MCB and the several feeder or branch breakers CB1, CB2 and CB3. These sensor inputs and outputs are wired to, or otherwise connected by means such as fiber-optic communications, etc., into the central processing device 24, which determines the magnitudes of currents based on the fault signals from MGFS, GFS1, GFS2, and GFS3, and either actuates or inhibits the associated circuit breakers' trip units. The current magnitudes or fault signals used in the determination can be peak, average, root-mean-square, or digitally processed as derived from the measured currents. Additionally, the fault signals may be digitally processed (or filtered using analog means, such as passive filters) and be represented as a fundamental power-frequency component only (i.e., 60 or 50 Hz) in order to improve discrimination of fault current flow from electrical "noise" or harmonic currents on the power system.

Alternatively, the central processing device 24 can similarly determine the magnitudes of admittances and impedances derived from the fundamental frequency (i.e., 60 or 50 Hertz) voltage and current quantities, and use the logic described below with reference to FIGS. 9a-b, 10a-b and 11b-c.

The main circuit breaker MCB and each feeder or branch circuit breaker (CB1, CB2 and CB3) of this separately-derived three-phase system has an associated ground-fault sensor (GFS1, GFS2 and GFS3) implemented as a core-balance sensor (a current transformer or an equivalent device, such as sensor using the "Hall effect" or a synthesis utilizing the summation of three, individual-phase current transformers of sufficient accuracy) schematically depicted at 50, 52, 54 and 56 respectively, that encloses the associated three-phase conductors (and neutral conductor, if applicable). Each three-pole feeder circuit breaker includes a shunt-trip device to facilitate rapid opening of the circuit. The sensors and circuit breakers may be separate or formed as integrated GFCI circuit breaker units.

Referring again to FIG. 1, the GFCIS-3Ph system also includes a voltage unbalance detection device 60 coupled to central processing device 24. The voltage unbalance detection device 60, which is also coupled to three-phase power supply system 10 via power buses 12, 14 and 16, is used to sense so-called "negative-sequence" and "zero-sequence voltages" during an unbalanced phase-to-ground voltage condition. Such negative-sequence and zero-sequence voltages are always present during a fault to ground on a three-phase power system. See, for example, FIGS. 2a-c, which exemplary implementations of a zero-sequence voltage unbalance detection device 60 as described in C. F. Wagner and R. D. Evans, "Symmetrical Components as Applied to the Analysis of Unbalanced Electrical Circuits," McGraw-Hill Book Co., 1933, New York. Alternatively, as would be appreciated by those skilled in the art, other hardware and software methods can be used sense, measure, detect, infer or otherwise determine "negative-sequence" and "zero-sequence voltages" that exist during an unbalanced phase-to-ground fault condition.

Figure 2A:
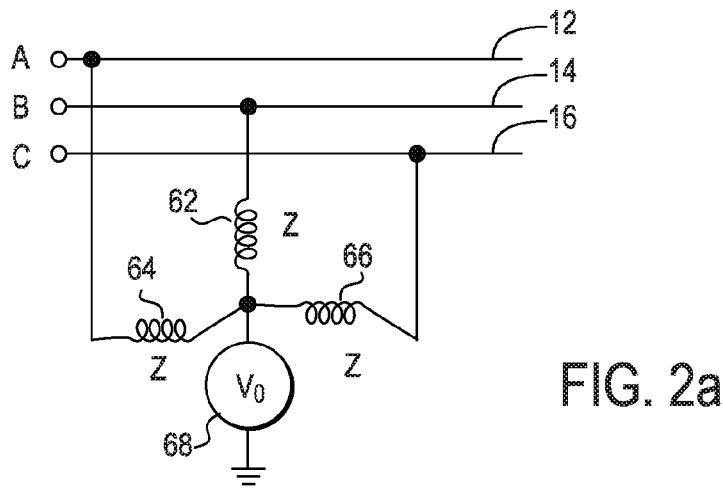
FIGS. 2a-c are exemplary implementations of a voltage unbalance detection device in accordance with the present invention.
Figure 2B:
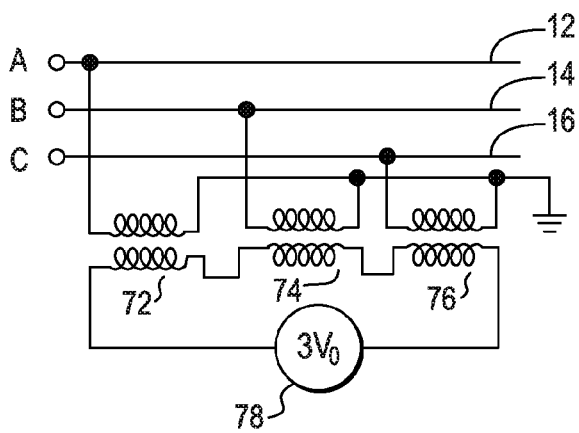
Figure 2C:
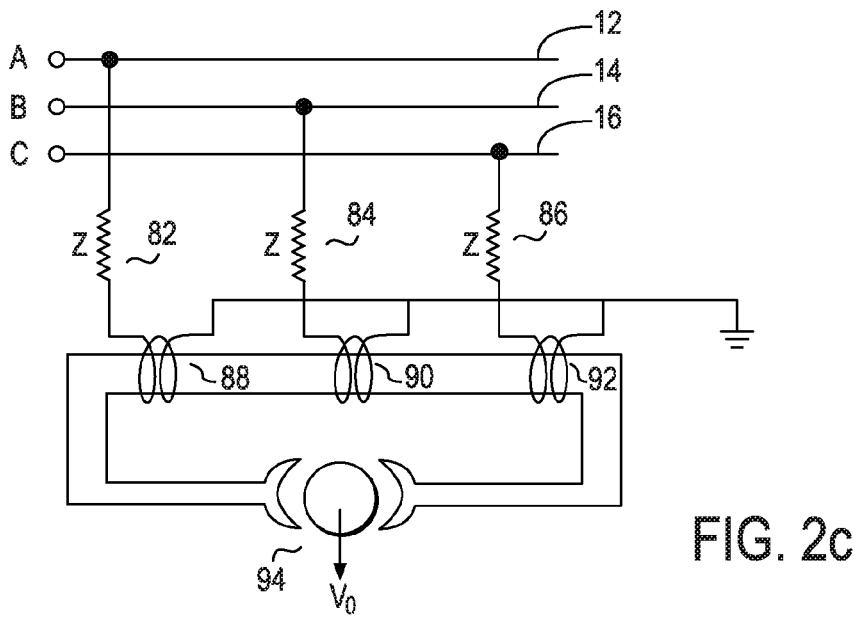

By using a commercially available voltage unbalance detection device 60 (for example, an instantaneous overvoltage relay as depicted in FIGS. 2a-c as 68, 78, or 94), an unbalanced phase-to-ground voltage condition as low as a few volts can be detected promptly, within approximately 0.02 to 0.04 seconds, on a three-phase power system. Typically, the zero-sequence voltage is only present during a fault to ground, while negative-sequence voltage is present during any unbalanced fault, i.e., phase-to-phase faults or for any phase fault involving ground. As such, it is preferable to use the voltage unbalance detection device 60 connected as shown in FIG. 2b to detect zero-sequence voltage (device 78, that measures 3 times $V_0$) during a fault to ground by summing the three line-to-ground voltages and dividing by three.

Alternatively, any of the circuits shown of FIGS. 2a-c can be used to detect the zero-sequence voltage. Still other methods of detecting the zero-sequence voltage can used, including the use of filtering and synthesis techniques to detect and synthesize the sequence components of only the fundamental power frequency voltages, for example at 50 Hz or 60 Hz. Commercially available overvoltage protective relays are available to accomplish the instantaneous overvoltage setpoint function, or the function may be integrated into the processor 24 of the GFCIS-3Ph system.

Consequently, when the magnitude of voltage unbalance exceeds a predetermined threshold amount, then other fault parameters, such as current, impedance and/or admittance are analyzed to determine if a threshold trip level or condition is satisfied, for example, 4 to 6 mA for a fault current. When fault currents are analyzed, for example, the processor 24 determines which GFCI unit has the highest magnitude of sensed current and identifies it as the main or feeder/branch that has the ground-fault and must be tripped (through trip output 40, 42, 44, or 46). The tripping of all other feeder or branch circuits will simultaneously be blocked or inhibited so as to avoid nuisance trips.

Referring again to FIG. 1, a typical three-phase system includes multiple feeder or branch circuits (only three are shown for simplicity, but the concept extends to an indefinite number), each having a GFCI unit including a ground-fault sensor (GFS) that provides input to the system processor 24 and controls the tripping of the appropriate circuit breaker (CB), should phase A' of feeder 18 suffer a fault "F" from phase A' to ground. The currents flowing in the circuits are as illustrated by $I_F$, $I_R$ and the groups of arrows $I_b$ and $I_c$. The distributed capacitance of the feeder cables is illustrated in dashed lines as three lumped capacitors connected between ground and each phase of each feeder or branch circuit and having currents $I_{GC1}$, $I_{GC2}$ and $I_{GC3}$. The fault signal or current $I_F$ can be expressed in terms of these currents and $I_R$ as in Equation (1) below:

$$I_F = I_{GC1} + I_{GC2} + I_{GC3} + I_R. \qquad \text{Equation (1)}$$

Alternatively, the fault signal or ground currents can be expressed in terms of impedances ($Z_F$) and admittances ($Y_F$). With a measured zero-sequence voltage, $V_0$, the impedance, $Z_F$, is $V_0/I_F$ and the admittance, $Y_F$, is $I_F/V_0$. Individual branch or feeder circuits that are not involved in the actual fault could be represented by impedances (Z) and admittances (Y) in the same ratios as above, only using the sensed currents in the respective feeder or branch circuit (e.g., $I_{GC1}$, $I_{GC2}$, or $I_{GC3}$). It is understood the that present invention can be used in connection with the grounding scenarios—"solidly-grounded," "high-resistance grounded," and "ungrounded"—depicted in FIGS. 3a-b, 4a-b and 5a-b and described in U.S. Pat. No. 7,301,739, but is not restricted from application to other system-grounding methods, such as power systems that are low-resistance grounded, resonant grounded, or reactance grounded.

In accordance with the present invention, the magnitude of the voltage unbalance (or zero-sequence voltage ($V_0$) can be used to determine the threshold at which the concepts of the three-phase ground-fault circuit-interrupter system as described in U.S. Pat. No. 7,301,739 are applied. If the detected zero-sequence voltage is sufficiently low, i.e., representing a small voltage unbalance to ground among the three phases, tripping a GFCI, e.g., for a person touching a phase conducted on a branch or feeder circuit and providing a path to ground or earth, may be determined by the zero-sequence current magnitude alone. Typically, when the sensed current on a faulted circuit exceeds 0.006 ampere but is less than approximately one ampere, the sensed capacitive current flow through all of the other non-faulted branch or feeder circuits on the utilization system would be insignificant, i.e., well below 0.006 A. The zero-sequence current, $I_0$ (actually 3 times $I_0$) can be measured by the core-balance current transformers applied to each of the feeder or branch circuits.

Figure 8A:
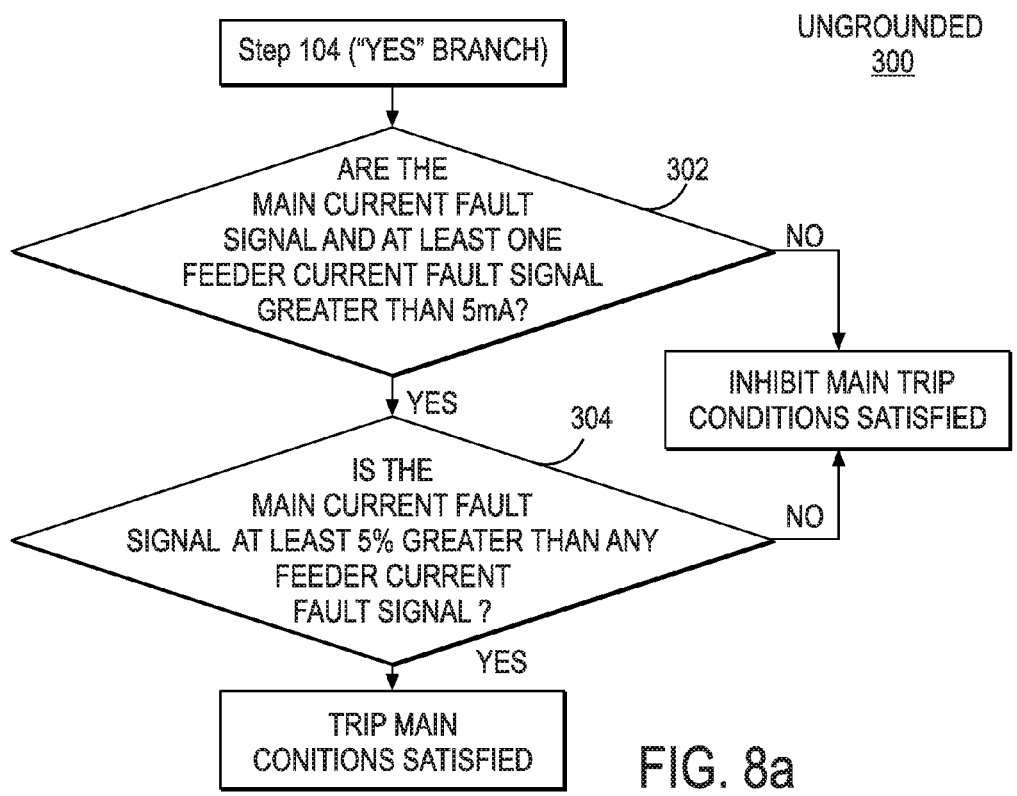
FIGS. 8a and b are flow charts illustrating a first set of methods for performing a main fault test of ungrounded and solidly-grounded/high-resistance grounded power systems, respectively, in accordance with the present invention.
Figure 8B:
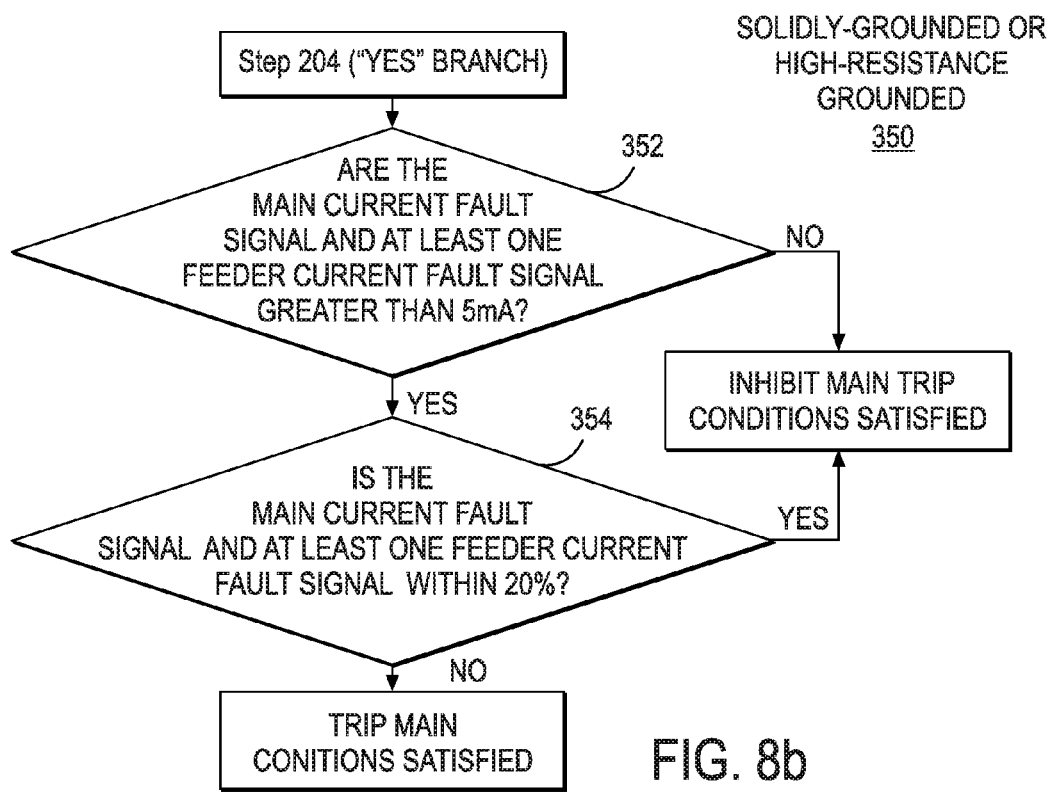
Figure 9A:
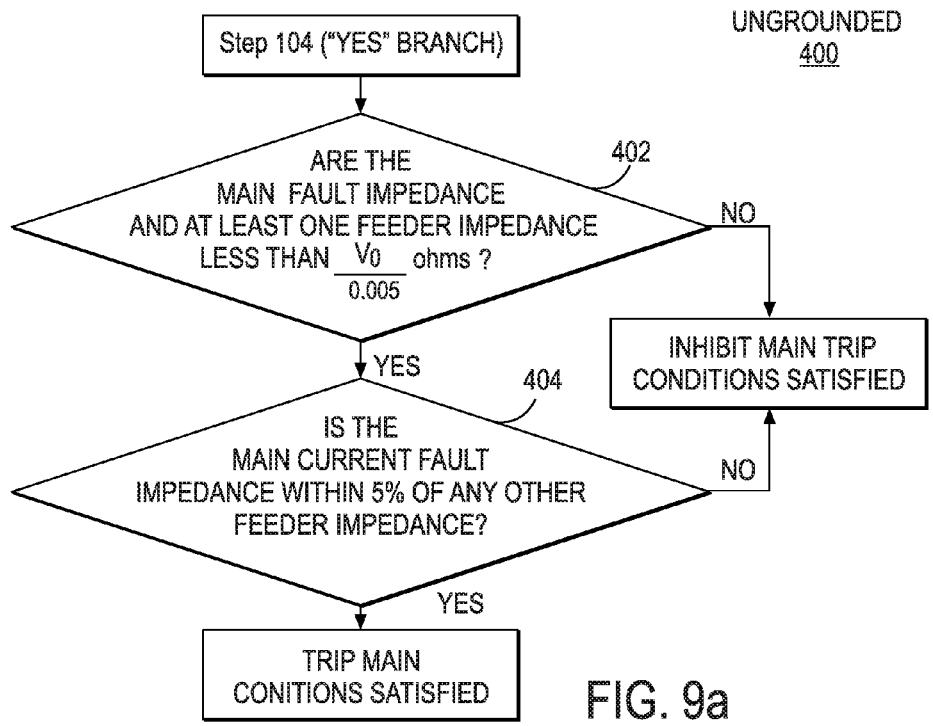
FIGS. 9a and b are flow charts illustrating a second set of methods for performing a main fault test of ungrounded and solidly-grounded/high-resistance grounded power systems, respectively, in accordance with the present invention.
Figure 9B:
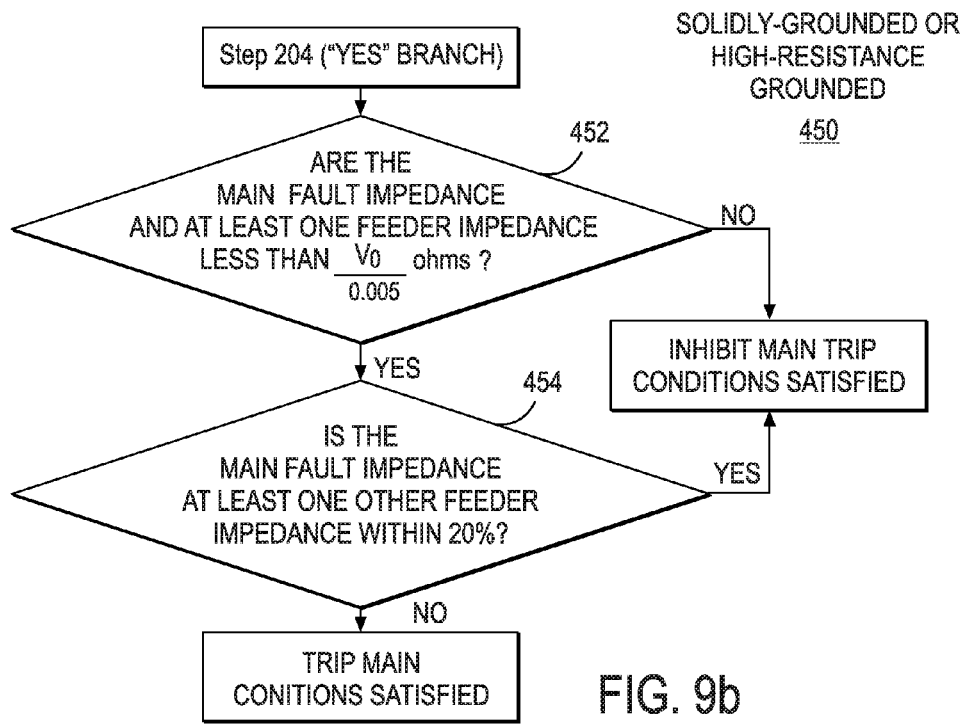
Figure 10A:
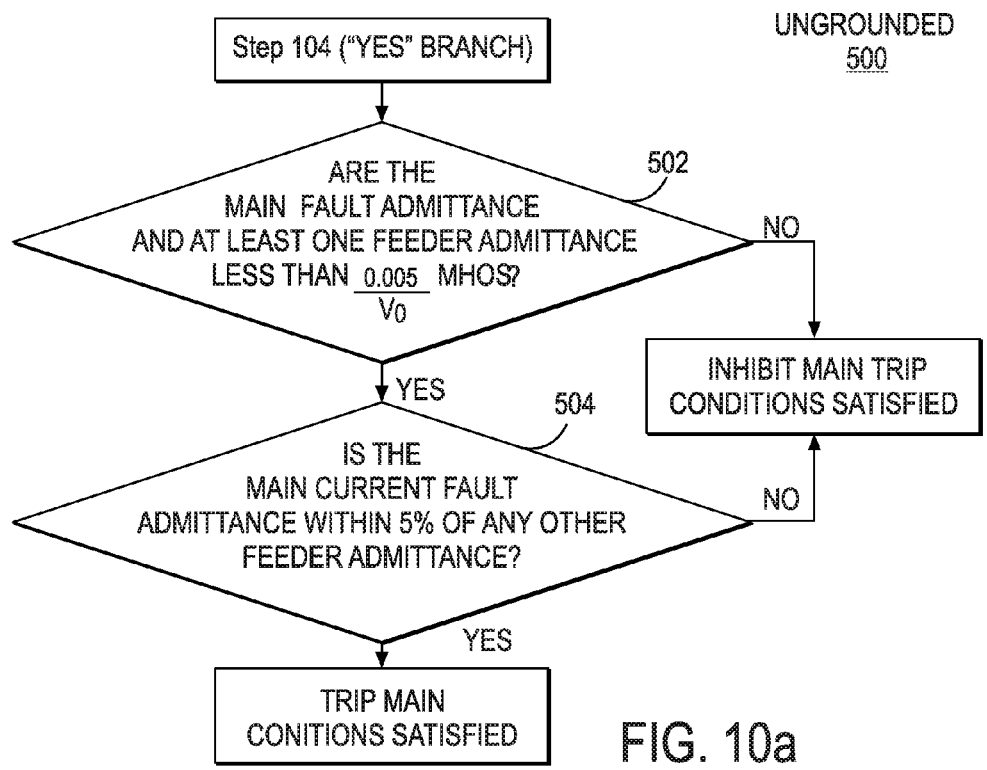
FIGS. 10a and b are flow charts illustrating a third set of methods for performing a main fault test of ungrounded and solidly-grounded/high-resistance grounded power systems, respectively, in accordance with the present invention.
Figure 10B:
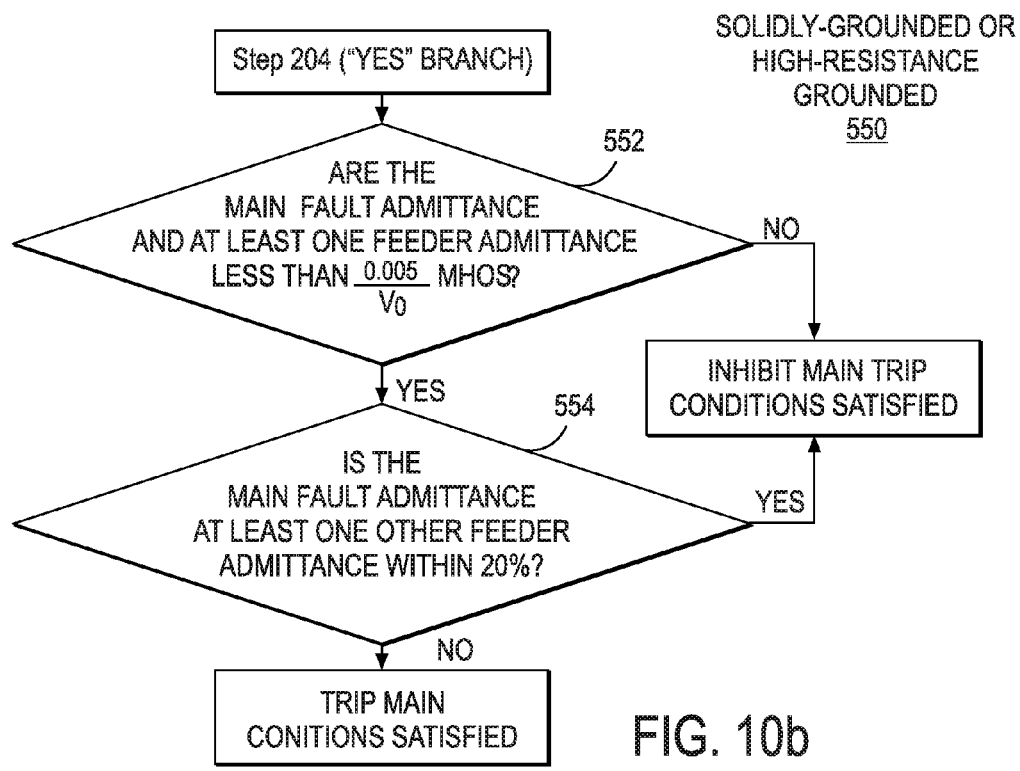

When the measured zero-sequence voltage exceeds a value representative of a fault current of significantly higher magnitude than that would occur with human contact, this trigger point may be used to enable the discrimination features of the three-phase ground fault interrupter system, and apply one of the following algorithms: (1) a current magnitude comparison algorithm, for example as shown in FIGS. 8a-b; (2) a zero-sequence impedance comparison algorithm, for example as shown in FIGS. 9a-b, to determine the smallest measured zero-sequence impedance, which is the ratio of the measured zero-sequence voltage divided by the measured zero-sequence current; or (3) a zero-sequence admittance comparison algorithm, for example as shown in FIGS. 10a-b, to determine the largest measured zero-sequence admittance, which is the ratio of the measured zero-sequence current divided by the measured zero-sequence voltage, of all the branch or feeder circuits of the utilization system. The current magnitude determined to be the largest, or the impedance determined to be the smallest, or the admittance determined to be the largest, as determined for each branch or feeder circuit individually, would be the branch or feeder circuit that would need to be disconnected to isolate the ground fault.

The main fault and feeder fault tests discussed with reference to FIGS. 6-10 can be "mixed and matched" by having for example a "current" test for the main fault test, and either an impedance or admittance test for the feeders or branch circuits.

The present invention is especially advantageous when the insulation of a conductor fails and relatively high current flows from phase to ground. Such a low impedance ground fault can distort the balance of the three voltages with respect to ground on the power system for the duration of the fault. The unbalance of the voltage with respect to ground can result in ground current flow, in excess of the ground-fault protection set-points, through the distributed capacitance of branch or feeder circuits that are not faulted. This spurious ground current flow is due to the unbalanced phase-to-ground voltages interacting with the capacitances to ground inherent to the branch or feeder circuits' components, e.g., insulated conductors or cables, motors, surge capacitors, lighting ballast transformers, etc. The voltage unbalance to ground, i.e., the "zero-sequence voltage," is directly measured by one of the circuits shown in FIGS. 2a-c. Alternatively, negative-sequence voltage detection techniques can be used to determine voltage unbalance among the three phases during a ground fault, since negative-sequence voltage is also present during a ground fault.

Advantageously, the present invention can provide security for the power system shown in FIG. 1 even during higher magnitude faults to ground, i.e., through tens of thousands of amperes, when the system voltages to ground can be severely unbalanced, compared to the current sensing sensitivity required for electrocution protection that may be as low as 0.006 ampere. During the low-level ground fault, the system voltages may be unbalanced insignificantly during the current flow through a person's body. In contrast, a high-level ground fault current can result in severe voltage unbalances and also cause a distortion of the output current from sensors that are designed to sense less than 0.006 ampere. The voltage unbalance detection feature can be combined with a current-transformer saturation detector (current sensor output distortion detection algorithm) to compensate for the magnetic saturation that may occur on a branch or feeder circuit ground-fault sensor (e.g., a zero-sequence current transformer) during high-level fault current to ground. This combination would then give an affirmative and secure logic indication of which feeder circuit is actually faulted to ground.

Zone-selective interlocking techniques as known in the art can also be applied to provide a logic input to the "upstream" GFCIS-3Ph to identify that the ground fault has occurred on a "downstream" distribution panel or switchboard (with its own GFCIS-3Ph) and accept an inhibit signal from that system.

As shown in FIG. 1, the processor 24 continuously monitors the current flow condition (the magnitude of the fault signal) sensed by each GFCI unit to detect a fault and makes a comparison of the sensor output (fault signal) of each GFCI unit to the sensor output of each other unit to determine the location of a fault. Once the location of a fault is determined, the faulted feeder circuit is interrupted and all other feeder circuits are inhibited from tripping.

Figure 6:
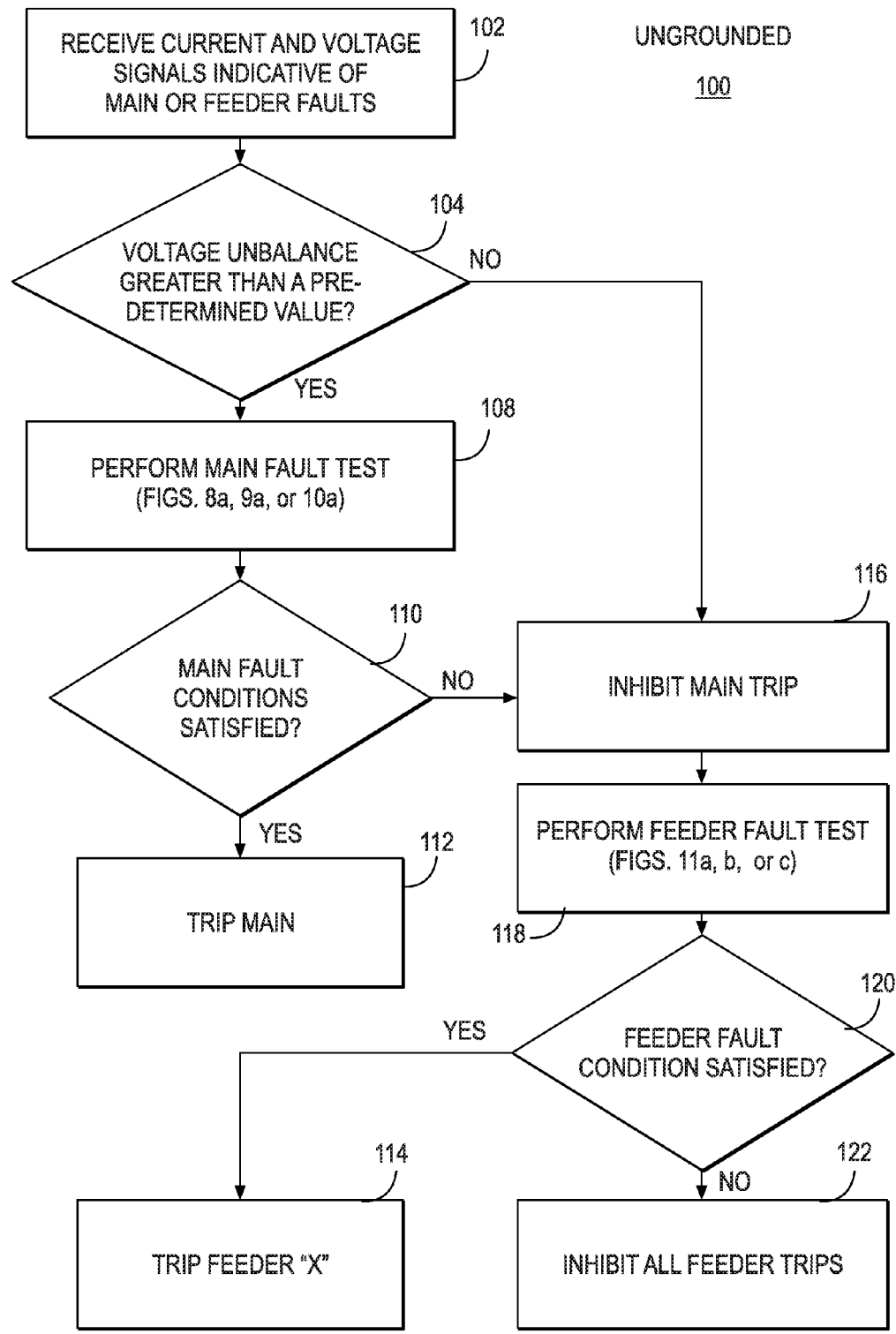
FIG. 6 is a flow chart illustrating operation of the processor of FIG. 1 for an ungrounded power system.
Figure 7:
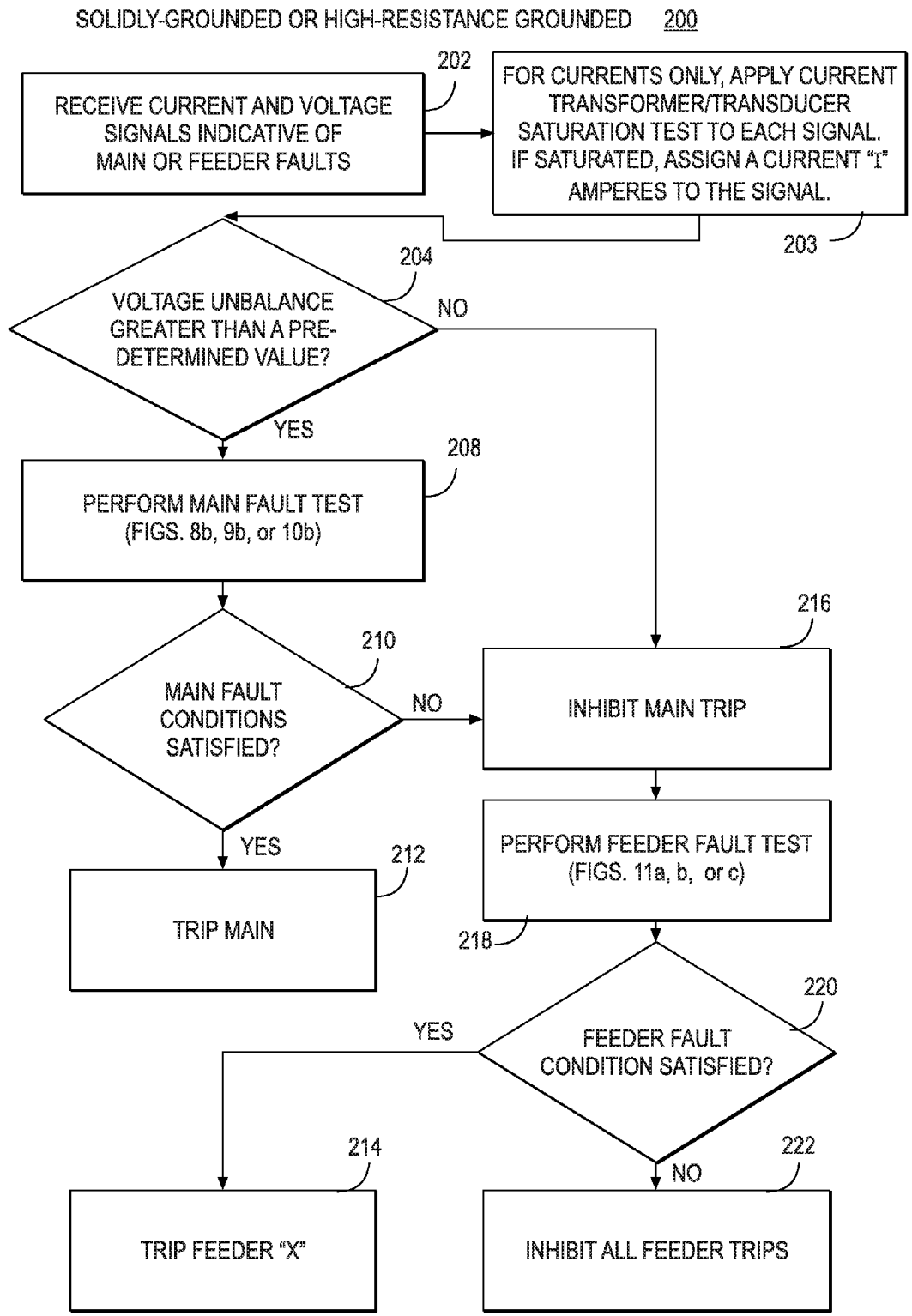
FIG. 7 is a flow chart illustrating operation of the processor of FIG. 1 for a solidly-grounded or high-resistance grounded power system.

In accordance with the present invention, a computer processor (reference numeral 24 in FIG. 1) executes instructions to continuously monitor the main GFCI unit and each feeder GFCI unit to determine when and where a fault has occurred, and in response thereto interrupts the faulted circuit and inhibits tripping of the non-faulted circuits. Operation of the processor 24 is shown generally by the logic flow charts depicted in FIGS. 6 and 7, which show computer-implemented fault interrupting methods for ungrounded and solidly-grounded/high-resistance grounded power systems, respectively. The methods 100 and 200, as shown in FIGS. 6 and 7, are similar in all respects except for steps 108 and 208 involving the main fault test. The method to be utilized would be determined by a selector switch or other selection method that would be set to the specific type of grounding on the power system on which the GFCIS-3Ph is applied.

The methods 100 and 200 include the steps of receiving signals indicative of main and feeder faults, such as main and feeder voltages and currents, including one or more signals indicative of an actual fault or of a voltage unbalance condition, step 102 or 202, and determining whether a voltage unbalance condition exists, step 104 or 204. If the voltage imbalance, for example in the form of a zero-sequence voltage, exceeds a predetermined value, then the controller 24 proceeds with a main fault test, step 108 or 208. For a 480V system, a nominal zero-sequence voltage pickup value is within the range of approximately 2 to 100 volts, and would depend primarily on the instrument voltage transformer ratio, the type of system grounding (e.g., solidly-grounded or high-resistance grounded), and the severity of the ground-fault current.

The controller continues by executing a main bus fault test (i.e., a fault involving 12, 14, or 16 in FIG. 1), which can take the form of FIGS. 8a, 9a and 10a for ungrounded systems, and FIGS. 8b, 9b and 10b for solidly-grounded/high-resistance grounded systems. FIGS. 8a and b show examples of current magnitude comparison algorithms 300 and 350 for ungrounded and solidly-grounded/high-resistance grounded, respectively.

In the case of an ungrounded system, if at any time, current sensed by the main unit and current sensed by at least one feeder unit both exceed a predetermined fault current threshold value (e.g., 5 mA), step 302, and if the current through the main unit is greater than the current through the feeder by a predetermined margin (e.g., 5%), step 304, a determination is made that a fault lies within the main circuit and a "trip" signal is sent to the main GFCI unit to trip the main circuit breaker, step 112 of FIG. 6. This condition would mean that the fault to ground is immediately downstream of the main CB's sensor, such as on a panel's main bus bars, and the main switching device needs to be tripped. If a smaller fault signal current (but still above the 5 mA "trip" threshold) is sensed on any of the feeder circuits compared to what is sensed by the main, and if the sensed fault signal current in the main is not at least 5% greater than that sensed in any feeder circuit, the main switching device is inhibited from a trip, step 116.

The 5% margin allows fault signal current levels to be easily discriminated between the main and feeder circuits' sensors, and is based principally upon results for the simulations on the "ungrounded" system. See for example Tables 3 and 6 of U.S. Pat. No. 7,301,739. It would apply for a normal configuration and number of feeder or branch circuits, i.e., a main and at least two feeder or branch circuits.

For the solidly-grounded and high-resistance grounded power systems (or for that matter, any impedance-grounded system), as depicted by the flow diagram of FIGS. 7 and 8*b*, the main fault test 350 determine whether or not the ground-fault current or fault signal sensed on any of the feeders is above a predetermined value, (e.g., 5 mA), step 352, and is close in magnitude (nominally within +/−10% to 20%) to the magnitude of the fault signal current sensed in the main circuit, step 354. If the conditions of main fault test 350 are satisfied, i.e., the "YES" branch of step 354, then inhibit main trip conditions are satisfied and an inhibit main trip signal is sent to prevent tripping of the main circuit breaker, step 216 of FIG. 7. Otherwise, if the decision block 354 is "NO", then trip main conditions are satisfied and a "trip" signal is sent to the main GFCI unit to trip the main circuit breaker, step 212 of FIG. 7.

Alternative embodiments of the main fault tests 400, 450, 500 and 550 of FIGS. 9*a-b* and 10*a-b* can be implemented using zero-sequence impedance and zero-sequence admittance comparison algorithms. FIGS. 9*a* and *b* corresponding to ungrounded and solidly-grounded/high-resistance grounded systems, respectively, include steps 402, 404, 452 and 454 for determining the smallest measured zero-sequence (or "fault") impedance, which is the ratio of the measured zero-sequence voltage divided by the measured zero-sequence current, comparing the main fault impedance and smallest feeder fault impedance to a predetermined fault impedance threshold value (e.g., $V_0/0.005$ ohms), steps 402 and 452, and comparing the main fault impedance to any of the feeder fault impedances to make sure the main fault impedance is at least within a certain percentage (e.g., +/−5% for ungrounded systems, +/−10% to 20% for solidly-grounded/high-resistance grounded systems) of at least one of the feeder fault impedances, steps 404 and 454.

FIGS. 10*a* and *b* corresponding to ungrounded and solidly-grounded/high-resistance grounded systems, respectively, include steps 502, 504, 552 and 554 for determining the largest measured zero-sequence (or "fault") admittance, which is the ratio of the measured zero-sequence current divided by the measured zero-sequence voltage, comparing the main fault admittance and the largest feeder fault admittance to a predetermined fault admittance threshold value (e.g., $0.005/V_0$ mhos), steps 502 and 552, and comparing the main fault impedance to any of the feeder fault impedances to make sure the main fault impedance is at least within a certain percentage (e.g., +/−5% for ungrounded systems, +/−10% to 20% for solidly-grounded/high-resistance grounded systems) of at least one of the feeder fault admittances, steps 504 and 554.

Figure 11A:
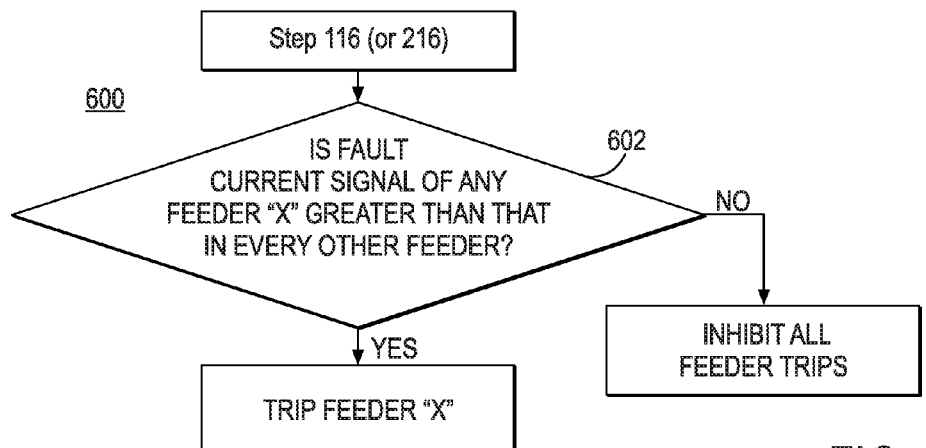
FIGS. 11a-c are flow charts illustrating methods for performing a feeder fault test in accordance with the present invention.
Figure 11B:
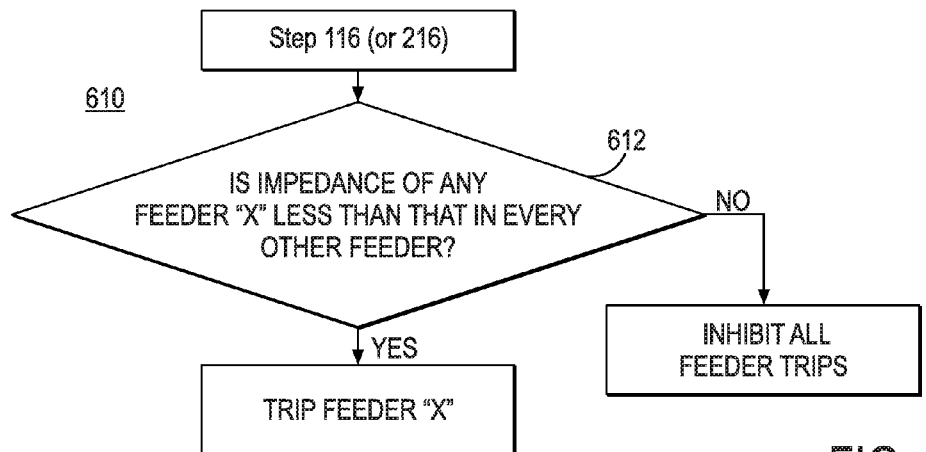
Figure 11C:
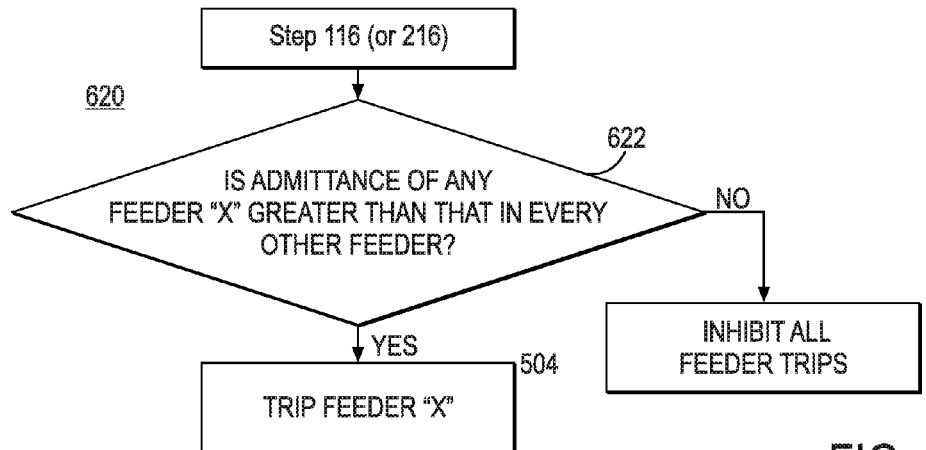

Referring again to FIGS. 6 and 7, if the current through the main unit is not within the predetermined margin of the current through the feeder unit, e.g., the "YES" branches of main fault tests 300, 350, 400, 450, 500, and 550, then a determination is made that the fault resides outside the main circuit and an "inhibit" signal is sent to the main GFCI unit to inhibit tripping of the main circuit, step 116 of FIG. 6 for ungrounded systems and step 216 of FIG. 7 high-resistance grounded systems. Each feeder unit's fault signal current also compared to each other feeder unit's fault signal current in accordance with a feeder fault test as shown by step 118 in FIG. 6 for ungrounded systems, and step 218 in FIG. 7 for solidly-grounded/high-resistance grounded systems. If, for example, it is found that the current through any feeder unit "X" is materially greater than that of the other feeder units in accordance with step 602 of feeder fault test 600 of FIG. 11*a*, then it is determined that the fault resides in the circuit of feeder unit "X," and a trip signal is sent to the GFCI unit of that circuit to trip its breaker. At the same time, inhibit signals are sent to all other feeder units to inhibit their tripping. If on the other hand, no feeder unit's fault signal current is materially greater than any feeder unit's fault signal current, it is determined that no fault resides among the feeder circuits, and all feeder circuits are inhibited from tripping. FIGS. 11*b* and 11*c* show similar feeder fault tests using zero-sequence impedance and zero-sequence admittance comparisons.

Non-limiting advantages of the present invention include providing protection from electrocution, preferably 0.006 to 0.030 ampere minimum pickup sensitivity in less than 0.1 second total fault clearing time, while minimizing occurrences of false trips during a high-level fault on the three-phase power system where the GFCIS-3Ph protection is applied.

Figure 12:
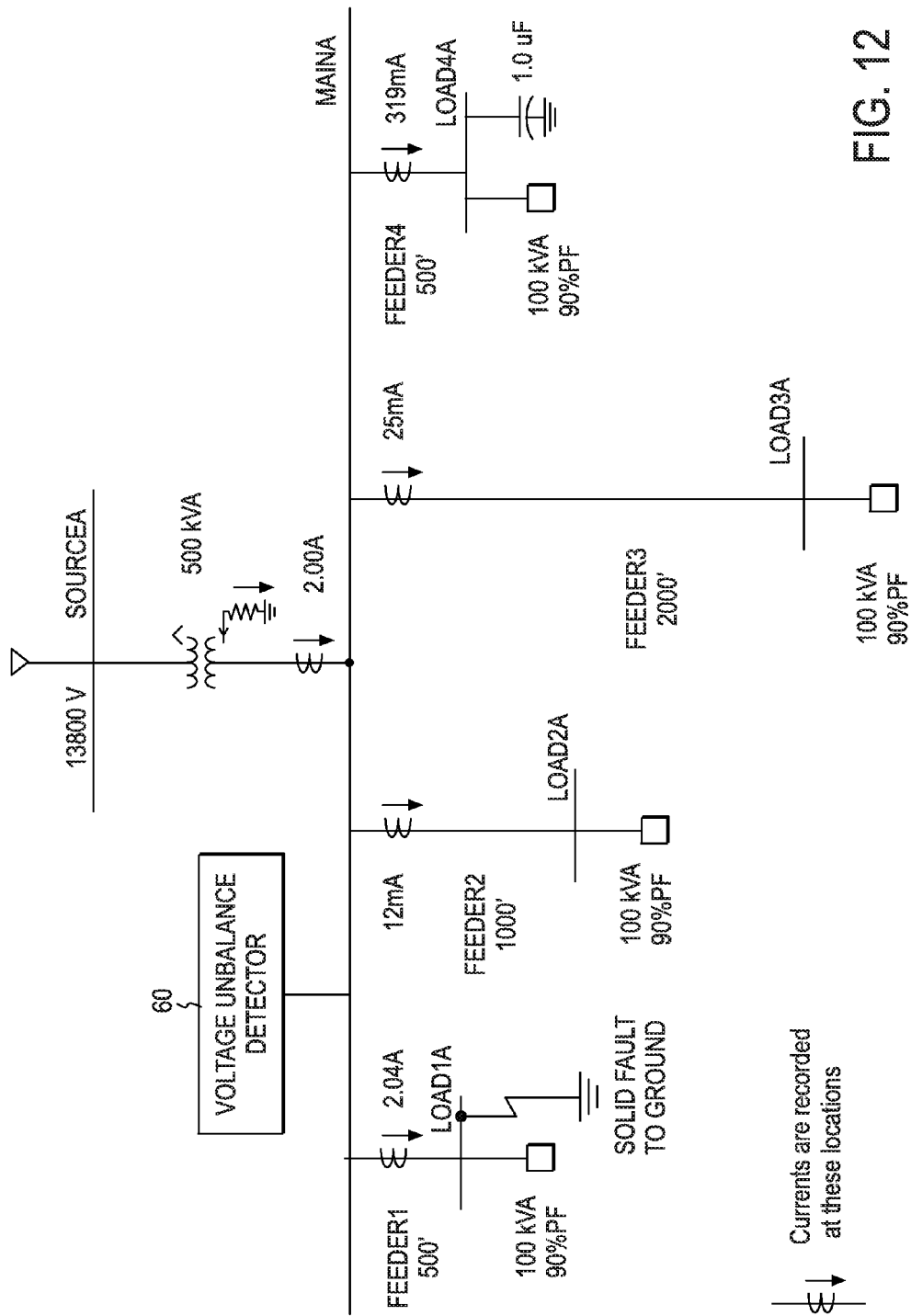
FIG. 12 is a diagram representation of a faulted three-phase high-resistance grounded power supply system having multiple feeder circuits.

FIG. 12 shows a first illustrative example of the present invention in connection with a simulated low-voltage, 480V phase-to-phase high-resistance grounded faulted power system, which was performed using V-Harm™ (Power System Harmonics Simulation and Analysis Program), by Cooper Power Systems (May 1988). As depicted in FIG. 12, a solid fault occurs on Feeder 1 from phase to ground, resulting in severe unbalance of the three phase voltages with respect to ground, thus resulting in a high zero-sequence voltage that exceeds a predetermined voltage imbalance threshold, e.g., approximately 2-100 volts. See FIGS. 4*a* and *b*, for example, which illustrate the relationship of voltages and currents during a solid Phase A fault to ground on a high-resistance grounded three-phase power system. The Feeder 1 fault current (2.04 A) is determined to be the largest of the Feeder fault currents, which in accordance to the main fault test of FIGS. 7 and 8*b*, would cause main trip to be inhibited since both the main fault and Feeder 1 currents are greater than the fault current threshold (5 mA in this case) the main fault current (2.00 A) is within 20% of the Feeder 1 fault current. Following with the logic in FIGS. 7 and 11*a*, each of the Feeder fault currents—2.04 A for Feeder 1, 12 mA for Feeder 2, 25 mA for Feeder 3, and 319 mA for Feeder 4—are compared to determined which, if any, feeder line "X" is to be tripped. This results in Feeder 1 being tripped, without the other feeders being tripped, since it is greater than the other feeder fault currents.

Alternatively, in accordance with the main trip test 450 of FIG. 9*b*, the GFCIS-3Ph processor can be programmed to determine feeder fault impedance values $Z_0(X)$ by dividing a measured zero-sequence voltage $V_0$ with each of the individual feeder fault currents $I_0(X)$, where "X" is each of the individual feeder lines. Assuming a measured zero-sequence voltage $V_0$ of 100 volts, for example, the GFCIS-3Ph processor would compute the following impedance values for each of the feeder lines: $Z_0(1)$=100V/2.04 A=49 ohms; $Z_0(2)$=100V/0.012 A=8300 ohms; $Z_0(3)$=100V/0.025 A=4000 ohms; and $Z_0(4)$=100V/0.319 A=310 ohms. The Inhibit main trip condition of logic 450 of FIG. 9b would be satisfied, which would cause logic 610 of FIG. 11b to trip only Feeder 1.

Another alternative is to calculate feeder fault admittances $Y_0(X)$ in accordance with the logic of FIG. 10b. Again, assuming a measured zero-sequence voltage $V_0$ of 100 volts, the calculated fault admittances would be as follows: $Y_0(1)$=2.04 A/100V=0.0204 mho; $Y_0(2)$=0.012 A/100V=0.00012 mho; $Y_0(3)$=0.025 A/100V=0.00025 mho; and $Z_0(4)$=0.319 A/100V=0.00319 mho. Inhibit main trip condition of logic 450 of FIG. 9b would be satisfied, which would similarly cause logic 620 of FIG. 11c to trip only Feeder 1.

Note, if the Feeder 1 fault of the above example were a fault of high-resistance, say a resistance of several thousand ohms, but resulting in a fault current above the 5 mA tripping set point, the sensed three-phase voltage unbalance may not be great enough to trigger the zero-sequence voltage detection, since the phase-to-ground voltages would not be distorted by the low-level fault current. All of the current transformers (current sensors) would operate in the unsaturated, linear sensing region. The GFCIS-3Ph processor 24 would delay for up to 0.030 second to wait for a zero sequence voltage input signal, and when none is received, initiate tripping Feeder 1 at 0.030+ second based on the fact that it is the highest sensed current magnitude of all the feeders. The above scenario description is a preferred sequence of events for a very low level fault current where the voltage unbalance test would not be invoked.

A second illustrative example of the present invention is now described in connection with a simulated low-voltage, 480V phase-to-phase, solidly-grounded faulted power system. See FIGS. 3a and b, for example, which illustrates the relationship of voltages and currents during a solid Phase A fault to ground on a solidly-grounded three-phase power system. The resulting phase-to-ground voltages are severely unbalanced, thus again triggering a zero-sequence voltage detection and the logic 200 of FIG. 7. Further, as shown by simulation results of Table 1, a solid fault on Feeder 1 results in 2.4 kA of ground fault current on the main and Feeder 1 lines, which results in saturation of the ground-fault sensing current transformer for the Main and Feeder 1. Typically, the zero-sequence voltage detection and current transformer saturation occur within approximately 0.030 second of the initiation of the ground fault. A test for current transformer saturation, for example using algorithms known in the art, can be used to detect for saturation when processing current signals indicative or suggestive of an actual fault condition. See for example Step 203 of FIG. 7. Simultaneously, during the ground fault, the Feeder 4 ground-fault sensor detects 26 mA from that feeder's capacitive charging current. Both sensed ground currents (Feeder 1 and Feeder 4) are above a trip set point of 6 mA. Since both excessive zero-sequence voltage and current transformer saturation are detected for Feeder 1, the GFCIS-3Ph logic initiates a trip of Feeder 1 only at 0.030+ second after the ground fault initiation.

TABLE 1

Summary Table of Fault Current (shaded blocks) and Current Distribution for "Series II" Case-system with no load on feeders

|  | Main | Fdr 1 | Fdr 2 | Fdr 3 | Fdr 4 |
|---|---|---|---|---|---|
| Phase-Ground Fault on Main Bus |  |  |  |  |  |
| Solid ground fault | 11 kA | 3 | 4 | 9 | 109 |
| 700 ohm ground fault | 396 | 0 | 0 | 0 | 1 |
| 46,000 ohm ground fault | 8 | 1 | 0 | 0 | 1 |
| Phase-Ground Fault on Feeder 1 |  |  |  |  |  |
| Solid ground fault | 2.4 kA | 2.4 kA | 1 | 2 | 26 |
| 700 ohm ground fault | 393 | 396 | 0 | 0 | 1 |
| 46,000 ohm ground fault | 6 | 6 | 0 | 0 | 0 |

Solidly-Grounded 480 Volt System;
Ground-Fault at "Far End" of Feeders;
No Load on All Feeders;
Feeder 4 with 1.0 μF Surge Capacitor Connected on Far End to Ground
(Current in milliamperes as sensed by a core-balance or differential current transformer, unless shown otherwise)

As for the first example above for the high-resistance grounded system, impedance or admittance determinations may be made using both zero-sequence voltage and zero-sequence current quantities. An arbitrarily large value of current (for example, 100 amperes, depending on the conditions where magnetic saturation of a current transformer would certainly occur) may be assigned to the current transformer determined to be in a saturated state in order to carry out this calculation algorithm.

Figure 13:
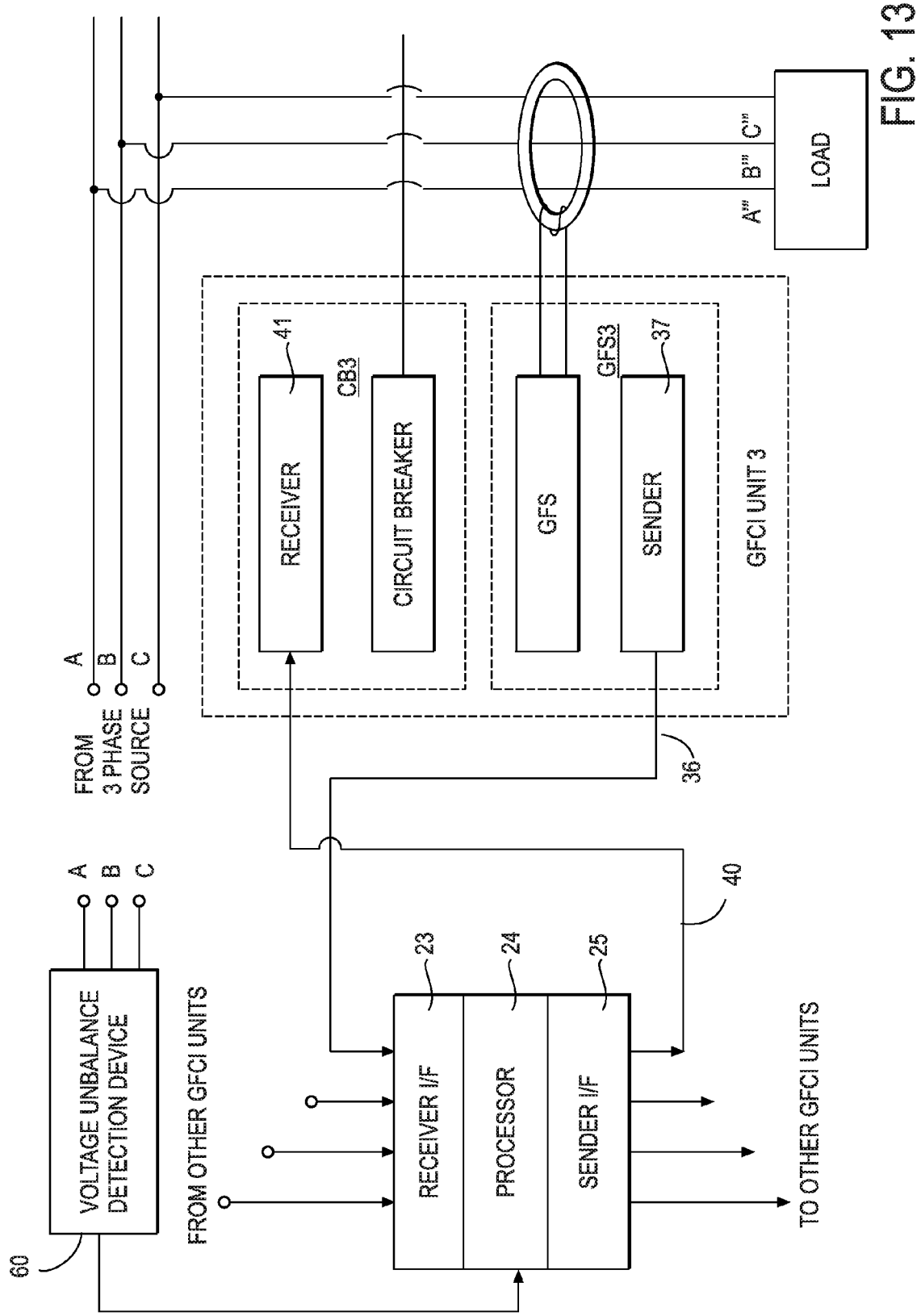
FIG. 13 is a block diagram representation of the fundamental components of a single feeder circuit of a polyphase GFCI system in accordance with the present invention.

FIG. 13 is a block diagram representation of the fundamental components of an exemplary embodiment of the present invention previously shown in a more generalized fashion in FIG. 1 above. In each case, the ground-fault interrupter system includes a processor 24 and assistant interface devices 23 (Receiver I/F to receive inputs) and 25 (Sender I/F to send outputs/trips) together with a number of GFCI Units such as the GFCI Unit 3 device illustrated in FIG. 13. The ground-fault sensor component (GFS3) provides a means to sense the unbalanced ground-fault current that flows in the three (or four) current-carrying feeder conductors A''', B''' and C''' (corresponding to a three- (or four-) wire three-phase system, the fourth wire being a current-carrying neutral conductor if existing). In one non-limiting embodiment, the GFS may include a conventional window (or core-balance type) current transformer that supplies an output current in the case of a power system current unbalance. In another non-limiting embodiment, the GFS may include another type of current-sensing device (e.g., a Hall-effect device) that supplies an output current or voltage signal, representing the instantaneous measured current magnitude from the GFS, in response to an unbalanced current flow in the conductors. This GFS signal, or "fault signal" as defined herein, is then translated by a "sender" unit 37 to an appropriate current, voltage, or light output that is communicated through an appropriate means of signal transmission (e.g., fiber-optic or metallic conductors 36) to the processor's "receiver interface" 23. The processor 24 then executes the necessary logic, described previously, to determine whether to send, or inhibit, a "trip" (or "open") signal to the "circuit breaker" or contactor through the processor's "sender I/F" 25. The trip or inhibit signal is then translated by the processor "sender I/F" unit 25 to the appropriate current, voltage, or light output through a means of signal transmission (e.g., fiber-optic or metallic conductors 40) to the circuit breaker's "receiver" unit 41.

Also in direct coupling or communication with the processor 24 is a voltage unbalance detection device 60 as described above with reference to FIGS. 1 and 2*a-c* for sensing so-called "negative-sequence voltage" or "zero-sequence voltage" during an unbalanced phase-to-ground voltage condition.

Any current interrupting device that can interrupt and isolate the three-phase circuit conductors of the supply voltage source may be used as the illustrated "circuit breaker." Current-interrupting devices may include, but are not limited to: air-magnetic or vacuum circuit breakers or motor circuit protectors, air or vacuum contactors, solid-state power switching devices, or electronically triggered fuses.

The signal to the circuit breaker's receiver 41 may be used to actuate a trip coil or a stored-energy trip-release mechanism, the interruption of current to a hold-in coil (e.g., as used for a contactor), or may be in the form of a current or voltage to initiate or stop the conduction of power semiconductor devices, or a current or voltage output to electronically trigger fuses. Although not shown, the power to supply any of the devices shown in FIG. 13 may be derived from an external power source or stored-energy supply (battery or capacitor), the voltage of the monitored power system itself, or energy derived from load current flow through the power system.

Although the present invention has been described above in terms of particular embodiments illustrated in the several figures of the drawing, it will be appreciated that other configurations of components and processing software may be utilized without departing from the spirit of the present invention. For example, any suitable form of GFCI unit capable of monitoring and reporting out current flow, and responding to control inputs to inhibit and/or interrupt a circuit may be used.

Furthermore, the techniques of the present invention may be applied to other fault detecting schemes such as the Residual Current Devices (RCD) employed outside of North America. Such devices usually have a somewhat higher nominal pickup sensitivity of 30 mA but are likewise intended to prevent ventricular fibrillation from an electrical shock. Although the RCD is not as susceptible to nuisance trips (from the individual feeder capacitive charging currents) due to its less sensitive pickup characteristics, it will be apparent that the usefulness of the present invention also applies to the RCD for sensitive "let go" personnel protection and for sensitive equipment protection.

Moreover, the present invention may be useful at higher voltages of say 720 volts, for example, and possibly even up to 1000 volts and beyond. But there may be a practical upper limit of application of the present invention for "unprotected" personnel (i.e., personnel without shock protection equipment, such as insulating rubber gloves and the like). The maximum current through the body, as calculated above, may also be higher for wet conditions. Above 1000 volts, other means might need be employed to reduce the current though the body to within human tolerance (e.g., use of insulating barriers such as mat, gloves, footwear, etc.), but the sensitive GFCIS-3Ph sensing technology of the present invention may still be used.

Notwithstanding that the present invention has been described above in terms of alternative embodiments, it is anticipated that still other alterations, modifications and applications will become apparent to those skilled in the art after having read this disclosure. It is therefore intended that such disclosure be considered illustrative and not limiting, and that the appended claims be interpreted to include all such applications, alterations, modifications and embodiments as fall within the true spirit and scope of the invention.

What is claimed is:

1. A ground-fault circuit-interrupter (GFCI) system for a polyphase power supply and a main bus circuit coupled thereto, the main bus circuit having a plurality of individual feeder circuits, the GFCI system comprising:
a voltage unbalance detection device coupled to all phase lines of the power supply for detecting at least one symmetrical component related to the phase lines, the symmetrical component being indicative of a voltage unbalance of the power supply;
a plurality of GFCI units respectively associated with the main bus and each one of the feeder circuits, each of the GFCI units being operative to generate a fault signal corresponding to a fault condition through an associated main bus or feeder circuit; and
a processor in communication with the voltage unbalance detection device and each of the GFCI units for monitoring the voltage unbalance and fault signals, and the processor being capable of generating one or more trip signals corresponding to an actual fault based at least in part on certain predetermined relationships between the voltage unbalance and the fault signals.

2. The system according to claim 1, wherein the processor comprises executable program code for:
determining when the actual fault exists based on a state of the voltage unbalance and certain predetermined relationships among the fault signal generated by the GFCI unit in the main bus circuit and the fault signals generated by each of the GFCI units in the feeder circuits;
determining which of the feeder circuits is experiencing the actual fault;
generating a trip signal to the GFCI unit or units corresponding to the one or more circuits experiencing the actual fault thereby causing the actually faulted circuit or circuits to be interrupted; and
generating an inhibit signal to a remainder of the feeder circuits, which are not experiencing the actual fault, thereby causing those non-faulted circuit or circuits to be inhibited from interruption.

3. The system according to claim 1, wherein the voltage unbalance detection device detects a zero-sequence voltage.

4. The system according to claim 1, wherein the voltage unbalance detection device detects a negative-sequence voltage.

5. The system according to claim 1, wherein the certain predetermined relationships comprise one or more comparisons of current signals.

6. The system according to claim 1, wherein the certain predetermined relationships comprise one or more comparisons of impedances.

7. The system according to claim 1, wherein the certain predetermined relationships comprise one or more comparisons of admittances.

8. A ground-fault circuit-interrupter (GFCI) system for a separately derived three-phase electrical power supply system including a three-phase power supply and a main bus circuit with a plurality of feeder circuits connected to the main bus circuit, comprising:
a voltage unbalance detection device simultaneously coupled to all phase lines of the three-phase power supply for detecting at least one symmetrical component related to the phase lines, the symmetrical component being indicative of a voltage unbalance of the power supply system;
a plurality of GFCI units respectively associated with the main bus and each one of said feeder circuits and operative to monitor a fault condition and to generate a fault signal corresponding to the fault condition and commensurate with the degree of unbalance of the currents flowing through the several conductors of each of the feeder circuits; and
a processor in communication with the voltage unbalance detection device and each of the GCFI units for continuously monitoring the voltage unbalance and the fault signals generated by the GCFI unit on the main bus circuit and the GCFI units on each feeder circuit connected to the main bus circuit, said processor being programmed to:
- determine when an actual fault condition exists based on certain predetermined relationships among the voltage unbalance, the fault signal generated by the GFCI unit in the main bus circuit, and the fault signals generated by the GFCI units in the feeder circuits;
- determine which of the main and feeder circuits is experiencing the actual fault;
- generate and transmit a trip signal to the GFCI unit in the actually faulted circuit causing that circuit to be interrupted; and
- generate and transmit an inhibit signal to at least some of the other circuits causing those circuits to be inhibited from interruption.

9. The system according to claim 8, wherein the voltage unbalance detection device detects a zero-sequence voltage.

10. The system according to claim 8, wherein the voltage unbalance detection device detects a negative-sequence voltage.

11. The system according to claim 8, wherein the certain predetermined relationships comprise one or more comparisons of current signals.

12. The system according to claim 8, wherein the certain predetermined relationships comprise one or more comparisons of impedances.

13. The system according to claim 8, wherein the certain predetermined relationships comprise one or more comparisons of admittances.

14. A computer-implemented method for ground-fault circuit-interruption (GFCI) of a polyphase power supply and a main bus circuit coupled thereto, the main bus system having a GFCI unit and plurality of feeder circuits, each of the feeder circuits also having a GCFI unit associated therewith, the method comprising:
- monitoring a voltage unbalance of the power supply system, wherein the voltage unbalance is indicated by at least one symmetrical component related to all phase lines of the polyphase power supply;
- monitoring fault signals generated by the several GFCI units; and
- determining when an actual fault condition exists based on the state of the voltage unbalance and certain predetermined relationships among the fault signal generated by the GFCI unit in the main bus circuit and the fault signals generated by the GFCI units in the feeder circuits.

15. The method according to claim 14, further comprising:
- determining which of the several circuits is experiencing an actual fault;
- generating a trip signal for the actually faulted circuit; and
- transmitting the trip signal to the GFCI unit in the actually faulted circuit thereby causing that actually faulted circuit to be interrupted.

16. The method according to claim 15, further comprising:
- generating one or more inhibit signals for one or more of the remaining circuits; and
- transmitting an inhibit signal to one or more of the GFCI units of the remaining circuits thereby causing those circuits to be inhibited from interruption.

17. The method according to claim 14, wherein the certain predetermined relationships comprise one or more comparisons of current signals.

18. The method according to claim 14, wherein the certain predetermined relationships comprise one or more comparisons of impedances.

19. The method according to claim 14, wherein the certain predetermined relationships comprise one or more comparisons of admittances.

20. An article of manufacture, comprising non-transitory computer usable medium having a computer readable program code embodied therein, the computer readable program code adapted to be executed to implement a method for ground-fault circuit-interruption of a polyphase power supply and a main bus circuit coupled thereto, the main bus system having a plurality of feeder circuits, the method comprising:
- monitoring a voltage unbalance of the power supply system, wherein the voltage unbalance is indicated by at least one symmetrical component related to all phase lines of the polyphase power supply;
- monitoring fault signals generated by several GFCI units; and
- determining when an actual fault condition exists based on the state of the voltage unbalance and certain predetermined relationships among a fault signal generated by the GFCI unit in the main bus circuit and fault signals generated by the GFCI units in the feeder circuits.

21. The article of manufacture according to claim 20, further comprising:
- determining which of the several circuits is experiencing an actual fault;
- generating a trip signal for the actually faulted circuit; and
- transmitting the trip signal to the GFCI unit in the actually faulted circuit thereby causing that actually faulted circuit to be interrupted.

22. The article of manufacture according to claim 21, the computer readable program code further adapted to perform the steps of:
- generating one or more inhibit signals for one or more of the remaining circuits; and
- transmitting an inhibit signal to one or more of the GFCI units of the remaining circuits thereby causing those circuits to be inhibited from interruption.

23. The article of manufacture according to claim 20, wherein the certain predetermined relationships comprise one or more comparisons of current signals.

24. The article of manufacture according to claim 20, wherein the certain predetermined relationships comprise one or more comparisons of impedances.

25. The article of manufacture according to claim 20, wherein the certain predetermined relationships comprise one or more comparisons of admittances.

* * * * *